United States Patent Office 3,420,588
Patented Jan. 7, 1969

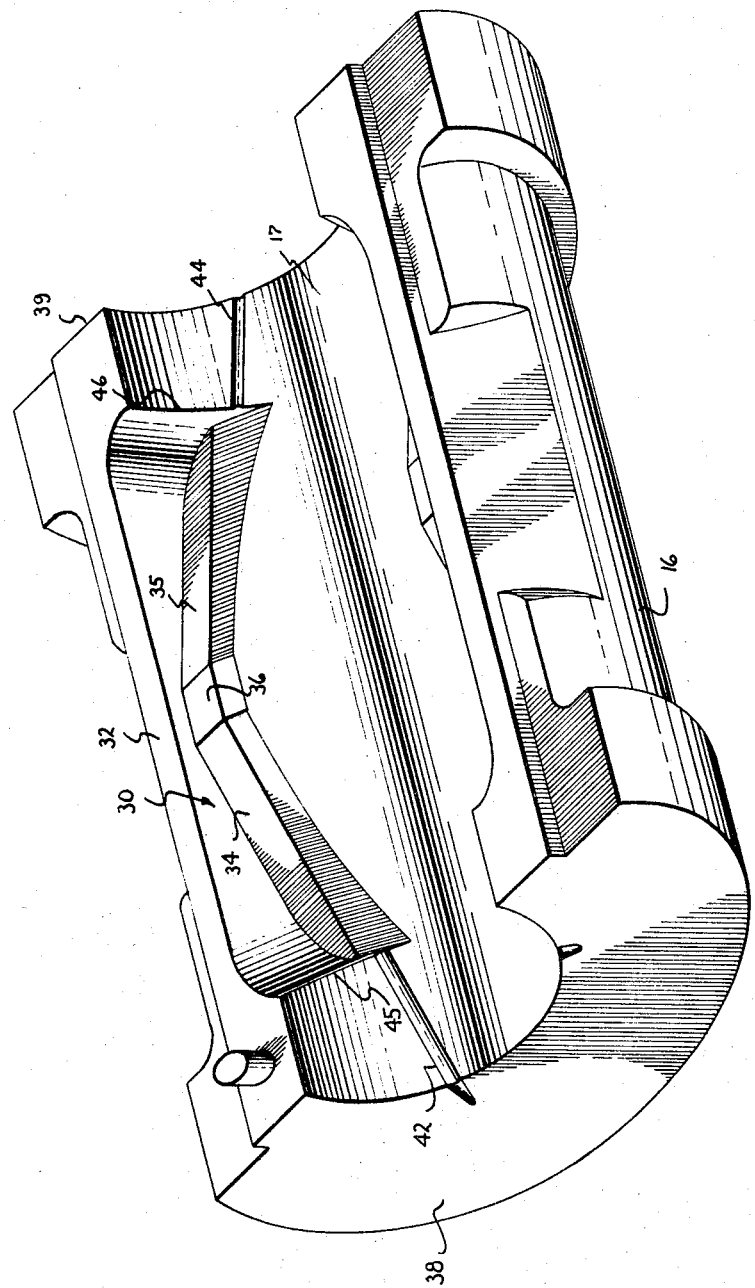

3,420,588
BEARINGS OF THE RING-OILED TYPE
Dan W. Kimberlin, Erie, Pa., assignor to General Electric Company, a corporation of New York
Filed July 11, 1966, Ser. No. 564,221
U.S. Cl. 308—128     8 Claims
Int. Cl. F16c 1/24

ABSTRACT OF THE DISCLOSURE

A ring-oiled type bearing having a specially contoured oil reservoir extending in the lining of the lower half thereof to provide a supply of oil over the entire surface of the bearing, whether the axis of a journal mounted in the bearing is horizontal or is tilted during use.

---

Figure 1:
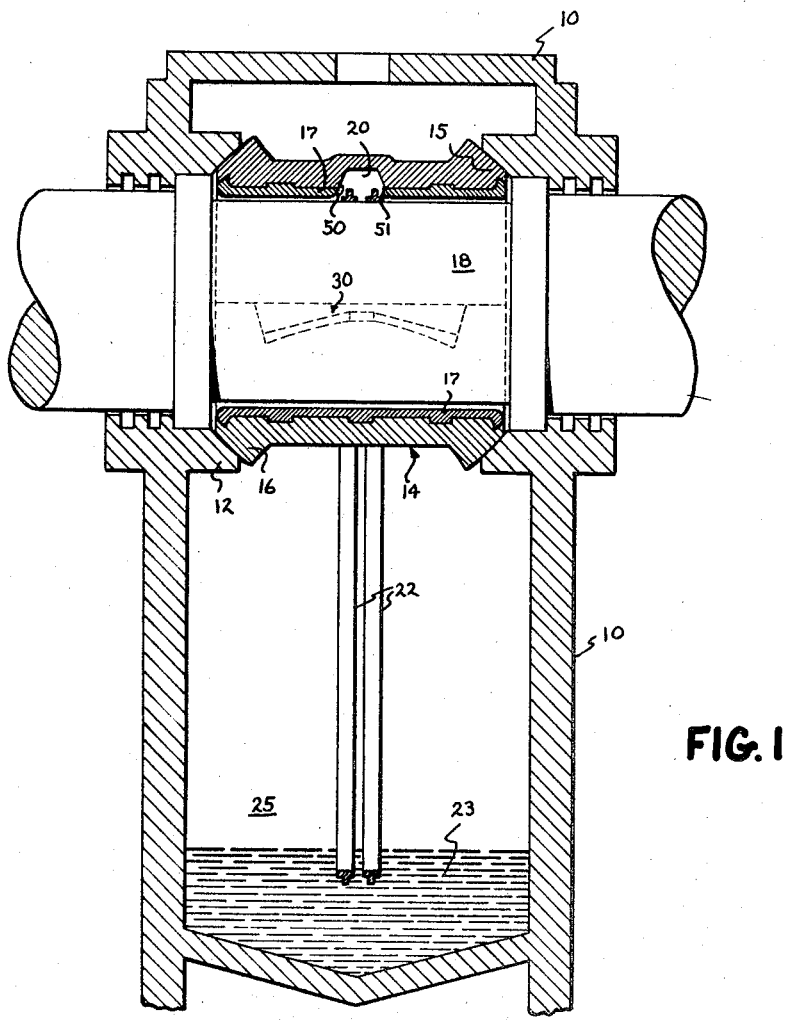

This invention relates to bearings of the ring-oiled type and more particularly to an improved bearing of such type which assures adequate lubrication over the entire bearing surface under operating conditions where the axis of the journal is not generally horizontal.

The types of bearings, such as shown in U.S. Patent No. 1,546,890, known as ring-oiled bearings incorporate a slot at the top extending through the wall so as to expose the journal of the shaft. One or more oil rings pass through the slot and ride upon the journal so that as the shaft rotates, the ring also rotates and carries oil from a chamber in the bottom of the bearing housing into which the lower portion of the ring projects to the top of the journal. The oil must then be distributed from the slot along the length and around the circumference of the bearing and various different types of grooves, such as spiral, longitudinal or circumferential, have been employed for this purpose. While such arrangements have been satisfactory for operation when the axis of the journal is horizontal, prior art ring-oiled bearings have not been satisfactory for extended use when the axis of the journal is not horizontal without incorporating some other means of lubrication than that provided by the oil rings. That is, for applications where the bearing is normally expected to be subjected to operation for more than very short periods of time with more than a few degrees of tilt from the horizontal, some other bearing arrangement has been required or some additional lubrication means provided in combination with the standard ring-oiled bearing. For example, it has been proposed, as shown in U.S. Patent No. 2,439,955, to provide a flood-lubrication means for a ring-oiled type bearing to allow for steady operation at tilted conditions.

It is an object of the invention, therefore, to provide a ring-oiled type bearing which assures a positive supply of oil over the entire surface of the bearing during operation when the axis of the journal is not horizontal.

It is another object of this invention to improve the reliability of ring-oiled bearings by assuring that the oil rings continue to rotate under all operating positions of the bearing.

It is a further object of the invention to assure an adequate supply of oil to the thrust surfaces at opposite ends of the bearing under all operating positions thereof.

Briefly stated, in accordance with one aspect of this invention, a specially contoured oil reservoir, or dam, is provided in the lower bearing half and this reservoir assures a positive supply of oil for the bearing even during extended periods of operation with the axis thereof tilted with respect to the horizontal thereby obtaining the cost advantages of the standard ring-oiled type bearing while at the same time obviating the restricting requirement that such bearings be limited to those applications where they may be run only in a substantially horizontal position.

To this end, an oil reservoir is provided in the lining of the lower half of the bearing extending longitudinally along the major part thereof. The reservoir, in one embodiment, is defined at its top by the longitudinal edge of the bearing half and at the bottom by surfaces which slope downwardly from a central region located below the longitudinal edge toward opposite ends of the bearing at an angle with respect to the longitudinal axis of the bearing. Preferably, these surfaces slope downwardly at an angle with respect to the longitudinal axis of the bearing which is at least as great as, and preferably at an angle of from about 5 to about 30 percent greater than, the angle (with respect to the horizontal) at which the bearing may be expected to operate for more than very short periods of time.

The novel features believed characteristic of the invention are set forth with particularity in the appended claims. The invention itself, however, both as to its organization and method of operation, together with further objects and advantages thereof, may best be understood by reference to the following description taken in connection with the accompanying drawings in which:

FIGURE 1 is a sectional view showing the general organization of the bearing; and FIGURE 2 is a perspective view of the lower bearing half showing the specially contoured oil reservoir provided therein.

Referring now to the drawings, there is shown in FIGURE 1 a housing 10 provided with a seat 12 in which a bearing block 14, including an upper bearing half 15 and a lower bearing half 16, is suitably positioned. Each of the bearing halves 15 and 16 is provided with a bearing lining 17, such as of babbit or the like. A shaft journal 18 is mounted for rotation in the bearing.

The upper half of the bearing block and lining is provided with an arcuate groove 20 in which the oil rings 22 run. The oil rings 22 hang on the shaft 18, as shown, and dip down into a supply of oil 23 in the chamber 25 in the bottom of housing 10.

As the shaft 18 rotates the oil rings 22 also rotate, since they run on the shaft, and in so doing act as a pump to carry oil from the chamber 25 in the bottom of housing 10 up to the top of the shaft 18. As is well known, there is always some clearance between the shaft and the bearing (shown exaggerated in FIGURE 1 for purposes of illustration) so that there is space for the passage of oil around the shaft. Also, at rest, the shaft and bearing are in contact due to the load on the shaft and this contact is often referred to as the "line of contact" between the shaft and the bearing, that is, the line on which the shaft and bearing lining contact when at rest due to the load on the shaft.

It will be readily understood that the arrangement so far described is that of a bearing provided with oil rings for providing lubrication thereto. Such arrangements are well known and the manner in which the oil is pumped up by the oil rings is also old and well known and may be taken as typical of any suitable bearing structure lubricated by one or more oil rings.

In accordance with this invention, a specially contoured oil reservoir 30 is provided in the lining of the lower bearing half 16 as shown by the dash lines in FIGURE 1 and in greater detail in FIGURE 2. The oil reservoir 30 extends longitudinally along the major part of the bearing half 16 and is defined at the top by the longitudinal edge 32 and at the bottom by the oppositely directed sloping surfaces 34 and 35. Surface 34 slopes downwardly from the central region 36 of the reservoir 30 toward the end 38 of the bearing half 16 while surface 35 slopes downwardly from the central region 36 toward the end 39. Central region 36 lies below the longitudinal edge 32 of the bearing so that there is at least some vertical distance from the top of region 36 to the longitudinal edge 32. Further, surfaces 34 and 35 are at an angle with respect to the longitudinal axis of bearing half 16. Preferably, this angle is at least as great as, and preferably from about 5 to 30 percent greater than, the angle at which the bearing may normally be expected to be required to operate for more than very short periods of time.

For example, in a particular arrangement, such as bearings for the electric motors used in a power shovel where the bearing is expected to be subjected to operation at angles up to about 15 degrees with respect to the horizontal for extended periods of time, the surfaces 34 and 35 may conveniently be at an angle of at least about 15 degrees with respect to the longitudinal axis of the bearing and preferably at an angle of about 20 degrees.

In operation with the bearing in a tilted condition with respect to the horizontal, oil is carried to the top of the shaft 18 by the oil rings 22 in the usual manner. This oil reaches the central region 36 of the reservoir 30 and flows in two paths therefrom, one path carrying oil "down-hill" to the lowermost half of the reservoir and the other path carrying oil also "down-hill" into the uppermost half of the reservoir. This is, as long as the bearing is not tilted to an angle greater than that of the angle of slope of the bottom of the reservoir, oil will be maintained in the "up-hill" side of the reservoir 30 thus assuring an adequate supply of oil to both ends of the bearing. For example, for a bearing with the bottom surfaces 34 and 35 sloped downwardly at an angle of about 20 degrees, an adequate supply of oil will be maintained in the "up-hill" side of the reservoir as long as the bearing is not tilted more than 20 degrees with respect to the horizontal.

To assure an adequate supply of oil to the thrust surfaces at the ends 38 and 39 of the bearing under all operating conditions, the bearing lining is also provided with grooves 42 and 44 which lead from the ends 45 and 46, respectively, of reservoir 30 to the ends 38 and 39 of the bearing. Oil is thus fed to the thrust surfaces at both ends of the bearing from the ends of the reservoir. Since as shown by the foregoing description both ends of reservoir 30 will always have oil maintained in them as long as the bearing is not operated under conditions where its longitudinal axis is at a greater angle with respect to the horizontal than that provided for by the slope of its bottom surfaces 34 and 35, the thrust surfaces at both ends of the bearing will always be assured of an adequate supply of oil.

When ring-oiled bearings are operated in a tilted position there is a possibility that the rings may become hung up on the side walls of the slot 20 and stop rotating. In accordance with another aspect of this invention reliable operation of the rings is assured by providing guide bearing surfaces 50 and 51 on opposite sides of the slot 20. These guide bearing surfaces may be of any suitable low friction type material and preferably are of a suitable resinous material such as nylon or the like and may be in the form of thin pads, roller guide pins or other suitable construction which will assure that the rings will continue to rotate with the shaft even though in contact with the guide bearing surfaces.

When the bearing is operated in the horizontal position oil is distributed uniformly from the reservoir 30 along the length of the bearing and also through the grooves 42 and 44 to the thrust surfaces at opposite ends of the bearing in the usual manner. With the bearing of the present invention, oil is similarly distributed as long as the bearing is not tilted with respect to the horizontal an amount greater than that provided for by the slope at the bottom of the reservoir.

While only a preferred embodiment of the invention has been set forth by way of illustration, many modifications and changes will occur to those skilled in the art. Accordingly, I intend by the appended claims to cover all such modifications and changes as fall within the true spirit and scope of the foregoing disclosure.

What I claim as new and desire to secure by Letters Patent of the United States is:

1. In a bearing of the ring-oiled type wherein a shaft is adapted to be journaled between the upper and lower bearing halves of a bearing block supported in a housing and a ring oil runs on the shaft and in an arcuate groove formed in the upper bearing half to convey lubricant from an oil-containing chamber in the bottom of the housing to the top of the shaft, the improvement comprising:

an oil reservoir formed in the lining of the lower bearing half extending longitudinally for a major part of the bearing, said oil reservoir being defined at its top by the longitudinal edge of said lower bearing half and at the bottom by surfaces which slope downwardly from a central region of the reservoir located below said longitudinal edge toward opposite ends of said bearing at a preselected angle with respect to the lontitudinal axis of the bearing, said reservoir being defined at each of the opposite ends by an end surface extending between said longitudinal edge and said bottom surface, said bottom surfaces and said end surfaces causing said reservoir to retain a supply of oil within it when the longitudinal axis of said bearing is horizontal and when the longitudinal axis is tilted less than the preselected angle from horizontal, with the retained supply of oil lubricating the entire surface of said bearing.

2. The bearing of claim 1 wherein said lower bearing half also includes grooves formed in the lining thereof which lead from opposite ends of the bottom of said oil reservoir to the adjacent end of the bearing half to provide a supply of oil from said oil reservoir to both ends of said bearing under all operating conditions.

3. The bearing of claim 1 wherein the surfaces defining the bottom of said oil reservoir slope downwardly from the central region thereof toward the opposite ends of the bearing at an angle with respect to the longitudinal axis of the bearing which is at least as great as the angle the bearing is normally expected to be operated with respect to the horizontal for more than brief moments.

4. The bearing of claim 1 wherein the surfaces defining the bottom of the oil reservoir slope downwardly at an angle in the range of about 18 to 20 degrees with respect to the longitudinal axis of the bearing.

5. The bearing of claim 3 wherein said lower bearing half also includes grooves formed in the lining thereof which lead from the bottom of opposite ends of the oil reservoir to the adjacent end of the bearing half to assure a supply of oil from the reservoir to the thrust surfaces at both ends of the bearing under all operating conditions.

6. The bearing of claim 2 wherein the surfaces defining the bottom of the oil reservoir slope downwardly at an angle in the range of about 18 to 20 degrees with respect to the longitudinal axis of the bearing.

7. The bearing of claim 1 wherein guide bearing surfaces are provided on the opposite side walls of the arcuate groove in the upper bearing half.

8. The bearing of claim 2 wherein guide bearing surfaces are provided on the opposite side walls of the arcuate groove in the upper bearing half.

References Cited

UNITED STATES PATENTS

| | | | |
|---|---|---|---|
| 1,272,490 | 7/1918 | Miller | 308—128 |
| 1,277,446 | 9/1918 | MacNeille | 308—128 |

MARTIN P. SCHWADRON, *Primary Examiner.*

FRANK SUSKO, *Assistant Examiner.*

UNITED STATES PATENT OFFICE
CERTIFICATE OF CORRECTION

Patent No. 3,420,588                            January 7, 1969

Dan W. Kimberlin

It is certified that error appears in the above identified patent and that said Letters Patent are hereby corrected as shown below:

Column 4, line 12, "ring oil" should read -- oil ring --.

Signed and sealed this 10th day of March 1970.

(SEAL)
Attest:

Edward M. Fletcher, Jr.

Attesting Officer

WILLIAM E. SCHUYLER, JR.
Commissioner of Patents